United States Patent
Britt et al.

(10) Patent No.: US 10,958,358 B2
(45) Date of Patent: Mar. 23, 2021

(54) SIGNAL TRANSMISSION SYSTEM AND METHOD

(71) Applicants: John Ellis Britt, Jersey Village, TX (US); Derek Shelby Bale, Cypress, TX (US); James Joseph Freeman, Houston, TX (US)

(72) Inventors: John Ellis Britt, Jersey Village, TX (US); Derek Shelby Bale, Cypress, TX (US); James Joseph Freeman, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 315 days.

(21) Appl. No.: 15/986,348

(22) Filed: May 22, 2018

(65) Prior Publication Data

US 2019/0363801 A1 Nov. 28, 2019

(51) Int. Cl.
*H04B 11/00* (2006.01)
*H04B 13/02* (2006.01)

(52) U.S. Cl.
CPC .............. *H04B 11/00* (2013.01); *H04B 13/02* (2013.01)

(58) Field of Classification Search
CPC .......... H04B 11/00; H04B 13/02; E21B 47/14
See application file for complete search history.

(56) References Cited

U.S. PATENT DOCUMENTS

| | | | |
|---|---|---|---|
| 3,603,145 A | 9/1971 | Morris | |
| 4,273,212 A | 6/1981 | Dorr et al. | |
| 5,062,482 A | 11/1991 | Graham | |
| 5,987,385 A | 11/1999 | Varsamis et al. | |
| 6,354,146 B1 | 3/2002 | Birchak et al. | |
| 6,442,105 B1 | 8/2002 | Tubel et al. | |
| 6,478,087 B2 | 11/2002 | Allen | |
| 7,128,144 B2 | 10/2006 | Fox et al. | |

(Continued)

FOREIGN PATENT DOCUMENTS

| | | |
|---|---|---|
| EP | 0635719 A2 | 1/1995 |
| WO | 2013148464 A1 | 10/2013 |

(Continued)

OTHER PUBLICATIONS

Chakraborty, et al.; "Estimating Channel Capacity and Power Transfer Efficiency of a Multi-Layer Acoustic-Electric Channel"; SPIE vol. 8753; 87530F-2; Retrieved from the internet: http://proceedings.spiedigitallibrary.org/ on Jun. 25, 2013 Terms of Use: http://spiedl.org/terms; 13 pages.

(Continued)

*Primary Examiner* — Daniel Pihulic
(74) *Attorney, Agent, or Firm* — Cantor Colburn LLP

(57) ABSTRACT

A signal transmission system including a first transducer mounted to a surface of a member, a second transducer movable into contact with a second surface of the member, a material disposed between the second transducer and the second surface of the member. A method for communicating acoustic energy through a member including pressing a second transducer to a second surface of the member, the member having a first transducer mounted to an opposite surface thereof, sandwiching a material between the second transducer and the second surface of the member, and transmitting a signal between the first transducer and the second transducer.

7 Claims, 1 Drawing Sheet

(56) References Cited

U.S. PATENT DOCUMENTS

| | | | |
|---|---|---|---|
| 7,261,168 | B2 | 8/2007 | Mcgregor et al. |
| 7,464,588 | B2 | 12/2008 | Steinsiek |
| 7,475,734 | B2 | 1/2009 | O'Malley |
| 7,644,760 | B2 | 1/2010 | Woloson |
| 9,054,826 | B2 | 6/2015 | Lawry et al. |
| 9,151,153 | B2 | 10/2015 | Liu et al. |
| 9,191,125 | B2 * | 11/2015 | Bagshaw ............... H04B 11/00 |
| 9,366,133 | B2 | 6/2016 | Difoggio et al. |
| 2005/0152219 | A1 | 7/2005 | Garcia-Osuna et al. |
| 2005/0205268 | A1 | 9/2005 | Engels et al. |
| 2008/0106972 | A1 * | 5/2008 | Liang ..................... E21B 47/12 367/25 |
| 2012/0163128 | A1 * | 6/2012 | Bagshaw ............... G08C 23/02 367/135 |
| 2013/0000399 | A1 | 1/2013 | Lilly et al. |
| 2015/0085949 | A1 | 3/2015 | Saulnier et al. |
| 2015/0176399 | A1 | 6/2015 | Searton et al. |
| 2015/0244473 | A1 | 8/2015 | Saulnier et al. |
| 2016/0053612 | A1 | 2/2016 | Proett et al. |
| 2019/0363801 | A1 * | 11/2019 | Britt ....................... E21B 47/14 |

FOREIGN PATENT DOCUMENTS

| | | | |
|---|---|---|---|
| WO | 2014035785 A1 | 3/2014 | |
| WO | 2015130662 A1 | 9/2015 | |
| WO | 2015148477 A1 | 10/2015 | |
| WO | WO-2019226247 A1 * | 11/2019 | ............. E21B 47/14 |

OTHER PUBLICATIONS

Chakraborty, et al.; "Low-Rate Ultrasonic Communication Axially along a Cylindrical Pipe"; 2014 IEEE Internal Ultrasonics Symposium Proceedings; pp. 548-551, total 5 pages.

Litman, et al.; "Shear and Longitudinal Acoustic Communication and Power Transfer Through Plates Using Acoustic Wedges"; ASME 2014 International Mechanical Engineering Congress & Exp; Nov. 14-20, 2014; Monetreal Canada; 7 pages.

Notification of Transmittal of the International Search Report and the Written Opinion of the International Searching Authority, or the Declaration; PCT/US2019/026869; dated Jul. 30, 2019; ISR 4 pages, WO 5 pages, Total pp. 9.

* cited by examiner

SIGNAL TRANSMISSION SYSTEM AND METHOD

BACKGROUND

Signal transmission (including energy signals) by acoustic transducers through another material is accomplished by seating one transducer on one side of the material and a second transducer on the opposite side of the same material. Energy is passed through the material and hence communication is established. In some environments attenuation of the signal may be more problematic than others. Lower density materials such as gasses are generally more problematic for acoustic coupling. Hence the use of acoustic transducer systems for communication in such conditions is less favored. Reliable communication using this method would be helpful to industries and particularly the resource recovery industry, for example in boreholes.

SUMMARY

A signal transmission system including a first transducer mounted to a surface of a member, a second transducer movable into contact with a second surface of the member, a material disposed between the second transducer and the second surface of the member.

A method for communicating acoustic energy through a member including pressing a second transducer to a second surface of the member, the member having a first transducer mounted to an opposite surface thereof, sandwiching a material between the second transducer and the second surface of the member, and transmitting a signal between the first transducer and the second transducer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
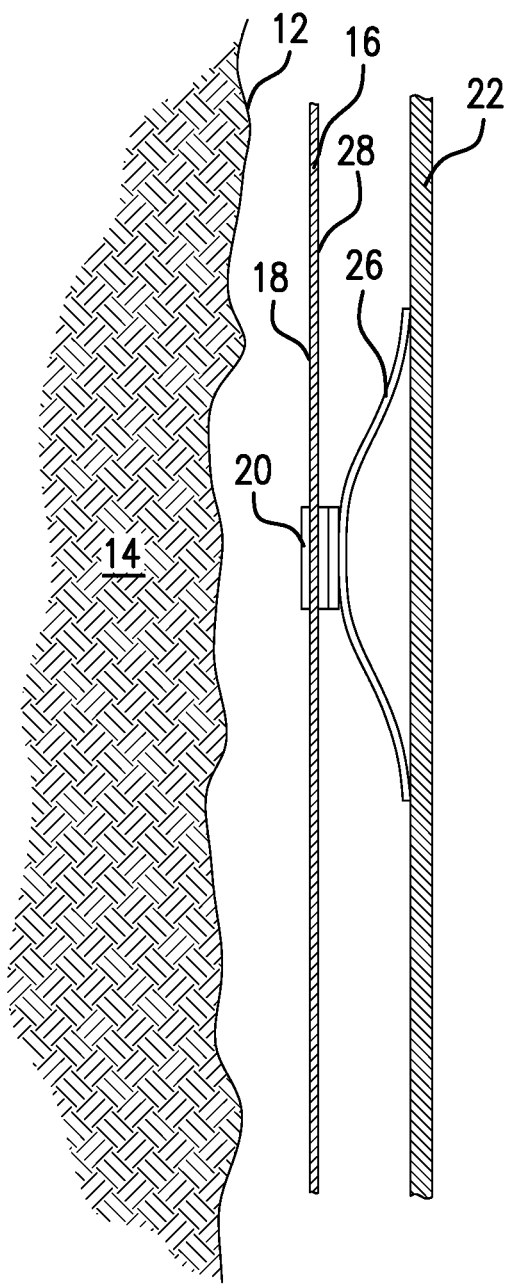
FIG. 1 is a schematic representation of an acoustic transducer energy transmission configuration in a borehole.

Referring to FIG. 1, a signal transmission system 10 for acoustic communication through another material is illustrated in a borehole 12 in a formation 14. A member 16 illustrated as a casing string is disposed in the borehole 12. On an outside surface 18 of the casing string 16, there is disposed a transducer 20. Subsequently to installation of the casing 16 in the hole 12 a tubing string 22 is run in the hole 12, the tubing string having a second transducer 24 associated therewith. The transducer 24 is mounted upon a mechanism 26 capable of moving the transducer radially outwardly into contact with an inner surface 28 of the casing 16. Such mechanisms 26 include centralizers, arms, swellables, inflatables, compressibles, etc. Operation of such mechanisms is well known to the art and they require no particular discussion here. Illustrated is a centralizer. The transducers 20 and 24 when aligned and disposed at opposite surfaces of the casing communicate with each other through acoustic energy.

A material 30 is disposed between the transducer 24 and the surface 28. Material 30 is acoustically transmissive and physically compliant to ensure that fluids and especially gasses cannot migrate to a location between the transducer 24 and the surface 28. Specifically, the compliance of the material ensures a full contact with the uneven surface 28 of the casing 16, leaving no gaps and the acoustic transmissivity ensures successful communications between transducer 24 and transducer 20. This is because the introduction of such contaminates attenuates the acoustic signal that is to be coupled to the casing 16 and thereby communicated to the transducer 20. If the signal attenuates significantly, then the process of communication or power transmission is defeated. This is clearly undesirable.

The material may be a coating on the surface 28 (up to the entire surface 28 may be coated), a coating on the transducer 24, an independent pad of material, etc. In the event a coating of the transducer 24 is employed, the coating may be only on a portion of the transducer that is to be in contact with the surface 28 or may be a coating that ranges from that portion to the entire transducer 24. The important point is that the portion of the transducer 24 that is to be in acoustic contact with the surface must not suffer the indignity of acoustically damping contaminates within the acoustic path between the transducer 24 and the surface 28. Because gas is a significant attenuator and a common occurrence in a wellbore, gas is particularly targeted to be excluded from the interface between the transducer 24 and the surface 28 or casing 16.

Figure 2:
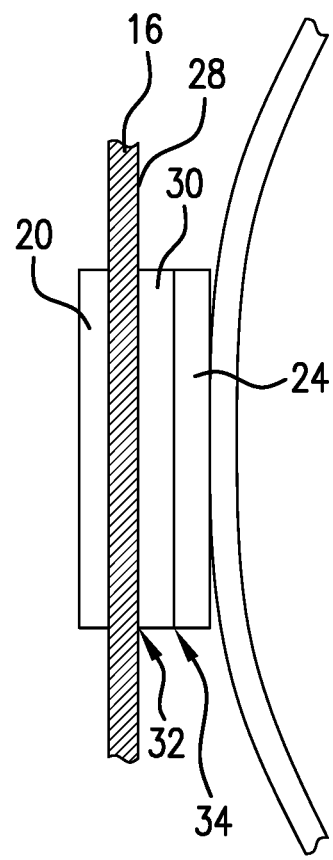
FIG. 2 is an enlarged section of FIG. 1 showing interfaces.

It is to be understood that in various embodiments there may be one or two interfaces that must exclude contaminants. These are 32 and 34. Where the material 30 is bonded to the member 16 or the transducer 24, such as in the form of a coating, then there is only one interface from which gas and contaminates must be excluded. Specifically if the material 30 is bonded to the member 16, the interface will be single and at 34 (FIG. 2). If the material 30 is bonded to transducer 24, the interface will be single and at 32 (FIG. 2). Alternatively, if the material 30 is a separate component, there will be two interfaces 32 and 34 from which contaminates must be excluded. Malleability of the material is important for all embodiments to ensure that the contact at these interfaces is a conforming contact. i.e. one that will deform into irregularities in the surfaces to ensure a contaminate free and acoustically couple contact.

Materials contemplated include rubbers, soft metals and plastics. For example only, rubbers considered desirable include: fluoroelastormers, perfluoroelastomers, etc., with 70 durometer being an iteration; soft metals include lead, tin, etc.; plastics include phenolics, etc. In each case, the material 30 is selected to conform to the surface irregularities of the surface 28 of casing 16 and a surface 32 of transducer 24 thereby excluding contaminates and acoustically coupling the transducer 24 to the casing 16.

A method for communicating acoustic energy through a member such as a casing 16 is also contemplated. The method includes pressing the second transducer 24 to the second surface 28 of the member 16. The pressing is done by any of the mechanisms noted above. Pressing results in a strong sandwiching of the material 30 between second transducer 24 and surface 28. By strong sandwiching, it is meant that some deformation of the material 30 is achieved at the same time. This ensures the material 30 conforms to any surface irregularities of the surface 28 and the transducer 24, thereby ensuring no contaminates including gas may enter and become trapped between the transducer 24 and the surface 28. Having accomplished the foregoing, the method further includes transmitting a signal between the first transducer and the second transducer in either direction.

Set forth below are some embodiments of the foregoing disclosure:

Embodiment 1

A signal transmission system including a first transducer mounted to a surface of a member, a second transducer movable into contact with a second surface of the member, a material disposed between the second transducer and the second surface of the member.

Embodiment 2

The system as in any prior embodiment, wherein the material is disposed on the second transducer.

Embodiment 3

The system as in any prior embodiment, wherein the material is a coating on the second transducer.

Embodiment 4

The system as in any prior embodiment, wherein the material is a pad on the second transducer.

Embodiment 5

The system as in any prior embodiment, wherein the material is a complete coating of the second transducer.

Embodiment 6

The system as in any prior embodiment, wherein the material is on the member.

Embodiment 7

The system as in any prior embodiment, wherein the material is a coating on the member.

Embodiment 8

The system as in any prior embodiment, wherein the material excludes contaminates from between the second transducer and the second surface of the member.

Embodiment 9

The system as in any prior embodiment, wherein the material is rubber.

Embodiment 10

The system as in any prior embodiment, wherein the material is soft metal.

Embodiment 11

The system as in any prior embodiment, wherein the material is plastic.

Embodiment 12

A method for communicating acoustic energy through a member including pressing a second transducer to a second surface of the member, the member having a first transducer mounted to an opposite surface thereof, sandwiching a material between the second transducer and the second surface of the member, and transmitting a signal between the first transducer and the second transducer.

Embodiment 13

The method as in any prior embodiment, wherein the sandwiching includes excluding contaminates between the second transducer and the second surface of the member.

Embodiment 14

The method as in any prior embodiment, wherein the excluding includes excluding gas.

Embodiment 15

The method as in any prior embodiment, wherein the sandwiching includes deforming the material.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A signal transmission system comprising:
a first transducer mounted to a surface of a member;
a second transducer movable into contact with a second surface of the member;
a material disposed between the second transducer and the second surface of the member, wherein the material is a pad on the second transducer.

2. A signal transmission system comprising:
a first transducer mounted to a surface of a member;
a second transducer movable into contact with a second surface of the member;
a material disposed between the second transducer and second surface of the member wherein the material is a coating on the second transducer.

3. The system as claimed in claim 2 wherein the material is a complete coating of the second transducer.

4. A signal transmission system comprising:
a first transducer mounted to a surface of a member;
a second transducer movable into contact with a second surface of the member;
a material disposed between the second transducer and the second surface of the member wherein the material is a coating on the member.

5. The system as claimed in claim 1 wherein the material excludes contaminates from between the second transducer and the second surface of the member.

6. A signal transmission system comprising:
a first transducer mounted to a surface of a member;
a second transducer movable into contact with a second surface of the member;
a material disposed between the second transducer and the second surface of the member, wherein the material is rubber.

7. A signal transmission system comprising:
a first transducer mounted to a surface of a member;
a second transducer movable into contact with a second surface of the member;
a material disposed between the second transducer and the second surface of the member, wherein the material is plastic.

* * * * *